(12) United States Patent
Her et al.

(10) Patent No.: US 10,068,545 B2
(45) Date of Patent: Sep. 4, 2018

(54) DISPLAY APPARATUS

(71) Applicant: SAMSUNG DISPLAY CO., LTD., Yongin-si, Gyeonggi-do (KR)

(72) Inventors: Yong-Koo Her, Yongin-si (KR); Jin Jeon, Suwon-si (KR); Kee-Han Uh, Yongin-si (KR); Yong-Je Jeon, Suwon-si (KR); Yong-Han Park, Anyang-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/497,080

(22) Filed: Apr. 25, 2017

(65) Prior Publication Data

US 2017/0236481 A1 Aug. 17, 2017

Related U.S. Application Data

(63) Continuation of application No. 11/860,240, filed on Sep. 24, 2007, now Pat. No. 9,746,727.

(30) Foreign Application Priority Data

Sep. 25, 2006 (KR) .......................... 10-2006-0092719

(51) Int. Cl.
*G09G 3/36* (2006.01)
*G02F 1/1362* (2006.01)
*G02F 1/1345* (2006.01)

(52) U.S. Cl.
CPC ....... *G09G 3/3677* (2013.01); *G02F 1/13452* (2013.01); *G02F 1/136209* (2013.01);
(Continued)

(58) Field of Classification Search
CPC .............. G02F 1/1345; G02F 1/13452; G09G 2300/0426; G09G 2300/0408; G09G 3/3648
See application file for complete search history.

(56) References Cited

U.S. PATENT DOCUMENTS 7,576,706 B2 8/2009 Lim et al.
2003/0076282 A1* 4/2003 Ikeda ................... G09G 3/3648
345/55

(Continued)

FOREIGN PATENT DOCUMENTS

CN 123440 5/1996
JP 05-150263 6/1993
(Continued)

*Primary Examiner* — Shaheda Abdin
(74) *Attorney, Agent, or Firm* — Innovation Counsel LLP (57) ABSTRACT

A display apparatus includes a first substrate, a second substrate, and a driver chip. The first substrate includes a plurality of gate lines disposed in the display area and extended in a first direction, a plurality of data lines disposed on a gate insulating layer insulating the gate lines and extended in a second direction substantially perpendicular to the first direction, and a gate driving circuit section disposed in the first peripheral area adjacent to first ends of the gate lines. The second substrate is opposite to the first substrate. A liquid crystal is interposed between the first and second substrates. The driver chip is disposed in the second peripheral area adjacent to second ends of the gate lines opposite to the first ends so that the width of the upper and lower portions of the display area may be decreased.

5 Claims, 9 Drawing Sheets (52) U.S. Cl.
CPC .......... *G02F 1/136286* (2013.01); *G09G 2300/0408* (2013.01); *G09G 2300/0426* (2013.01); *G09G 2310/0286* (2013.01)

(56) References Cited

U.S. PATENT DOCUMENTS

| | | | |
|---|---|---|---|
| 2003/0102479 A1* | 6/2003 | Joo | H01L 29/66757 257/72 |
| 2004/0125256 A1* | 7/2004 | Park | G02F 1/134363 349/43 |
| 2005/0134548 A1* | 6/2005 | Kim | G09G 3/3406 345/102 |
| 2005/0146486 A1 | 7/2005 | Lim et al. | |
| 2005/0184943 A1 | 8/2005 | Nakajima | |
| 2006/0170636 A1 | 8/2006 | Nakamura et al. | |
| 2006/0238463 A1 | 10/2006 | Kim et al. | |
| 2006/0267912 A1* | 11/2006 | Lee | G09G 3/3266 345/100 |

FOREIGN PATENT DOCUMENTS

| | | |
|---|---|---|
| JP | 06-202124 | 7/1994 |
| JP | 2002-189229 | 7/2002 |
| JP | 2003-057662 | 2/2003 |
| JP | 2003-172944 | 6/2003 |
| JP | 2003-295785 | 10/2003 |
| JP | 2004-053702 | 2/2004 |
| JP | 2004-325956 | 11/2004 |
| JP | 2004-354573 | 12/2004 |
| JP | 2005-091962 | 4/2005 |
| JP | 2005-196217 | 7/2005 |
| JP | 2006-309223 | 11/2006 |
| KR | 10-2005-0046173 | 5/2005 |

\* cited by examiner

DISPLAY APPARATUS

CROSS-REFERENCE TO RELATED APPLICATION

The present application claims priority to and the benefit of U.S. patent application Ser. No. 11/860,240, filed on Sep. 24, 2007, which claims priority under 35 U.S.C. § 119 to Korea Patent Application No. 10-2006-0092719, filed on Sep. 25, 2006, in the Korean Intellectual Property Office (KIPO), the contents of which are herein incorporated by reference in their entirety.

BACKGROUND OF THE INVENTION

Field of the Invention

The present invention relates to a display apparatus and, more particularly, to a display apparatus having a minimized peripheral region disposed at the upper and lower sides of the display area.

Description of the Related Art

Generally, a display apparatus includes a display substrate having a plurality of gate and data lines crossing each other and defining a plurality of pixels, an opposite substrate, a liquid crystal interposed between the substrates, and a driver chip coupled with the display substrate.

In a conventional display apparatus, the driver chip is located in an upper portion or a lower portion of the display area corresponding to end portions of the data lines thereby increasing the length of the display apparatus. If buttons for operating the device are to be disposed at the side of the display screen, such as in a digital still camera, etc., it is necessary for the upper-and-lower lengths of the display screen to be decreased.

BRIEF SUMMARY OF THE INVENTION

According to one aspect of the present invention a display apparatus having a reduced peripheral area adjacent to upper and lower portions of the display area includes a display area and first, second, third and fourth peripheral areas surrounding the display area. The display apparatus includes a first substrate, a second substrate, and a driver chip. The first substrate includes a plurality of gate lines, a plurality of data lines, and a gate driving circuit section. The gate lines are disposed in the display area and extended in a first direction. The data lines are disposed on a gate insulating layer insulating the gate lines and extended in a second direction substantially perpendicular to the first direction. The gate driving circuit section is disposed in the first peripheral area adjacent to first ends of the gate lines. The second substrate is opposite to the first substrate to interpose a liquid crystal between the first and second substrates. The driver chip is disposed in the second peripheral area adjacent to second ends of the gate lines opposite to the first ends.

The display substrate includes a plurality of first data signal applying lines and a plurality of second data signal applying lines. The first data signal applying lines are disposed in the third peripheral area adjacent to first ends of the data lines and connects even-numbered data lines of the data lines with the driver chip. The second data signal applying lines are disposed in the fourth peripheral area adjacent to second ends of the data lines opposite to first ends of the data lines and connects odd-numbered data lines of the data lines with the driver chip.

The first data signal applying lines include first even-numbered signal applying lines and second even-numbered signal applying lines. The first even-numbered signal applying lines are connected to (n-2)-th data lines. The second even-numbered signal applying lines are connected to n-th data lines. "n" is a multiple number of four. The first even-numbered signal applying lines are formed from a first layer. The second even-numbered signal applying lines are formed from a second layer. The gate insulating layer is disposed between the first layer and the second layer.

The second data signal applying lines include first odd-numbered signal applying lines and second odd-numbered signal applying lines. The first odd-numbered signal applying lines are connected to (n-3)-th data lines. The second odd-numbered signal applying lines are connected to (n-1)-th data lines. The first odd-numbered signal applying lines are formed from a third layer. The second odd-numbered signal applying lines are formed from a fourth layer. The gate insulating layer is disposed between the third layer and the fourth layer.

The first even-numbered signal applying lines and the first odd-numbered signal applying lines may be formed from a layer for the gate lines and the second even-numbered signal applying lines and the second odd-numbered signal applying lines may be formed from a layer for the data lines.

The first even-numbered signal applying lines and the first odd-numbered signal applying lines may include a first metal having substantially a same material as the gate lines, and the second even-numbered signal applying lines and the second odd-numbered signal applying lines may include a second metal having substantially a same material as the data lines. A proportion of width of one of the first even-numbered signal applying lines and the odd-numbered signal applying lines to width of one of the second even-numbered signal applying lines and the second odd-numbered signal applying lines is substantially a same as a proportion of specific resistance of the first metal to specific resistance of the second metal.

The gate driving circuit section may include a shift resister including a plurality of driving transistors.

The display substrate may include a plurality of gate signal applying lines formed in at least one of the third and fourth peripheral areas. The gate signal applying lines connect the driver chip with the gate driving circuit section. The gate signal applying lines may be formed in an outer area of the first data signal applying lines or in an outer area of the second data signal applying lines.

The driver chip may include output pads arranged in accordance with a direction in which the gate lines are arranged. The output pads output various output signals. The output pads may include a common voltage pad, first data signal pads, second data signal pads, and gate signal pads. The common voltage pad is disposed in a central portion of the output pads, and outputs a common voltage. The first data signal pads are arranged toward the third peripheral area with respect to the common voltage pad and electrically connected to the first data signal applying lines. The second data signal pads are arranged toward the fourth peripheral area with respect to the common voltage pad and electrically connected to the second data signal applying lines. The gate signal pads are disposed in an outer area of the first and second data signal pads and electrically connected to the gate signal applying lines.

The first substrate may include a short point portion electrically connected to the second substrate. The short point portion may be formed between the first data signal applying lines and the second data signal applying lines, and may be electrically connected to the common voltage pad.

The second substrate may include a light shielding layer formed in the first, second, third and fourth peripheral areas. The light shielding layer covers the gate driving circuit section.

The display apparatus may further include a seal line disposed between the first and second substrates and formed along edges of the first and second substrates. The seal line includes a material cured by external light irradiated onto the seal line. A portion of the light shielding layer corresponding to the seal line may be removed. Also, a slit part exposing the seal line may be formed in a portion of the light shielding layer corresponding to the seal line.

According to an exemplary embodiment of the display apparatus, the area of the first and second peripheral areas adjacent to upper and lower portions of the display area may be decreased.

BRIEF DESCRIPTION OF THE DRAWINGS

The above and other features and advantages of the present invention will become more apparent by describing in detailed example embodiments thereof with reference to the accompanying drawings, in which.

DESCRIPTION OF THE EMBODIMENTS

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

Spatially relative terms, such as "beneath," "below," "lower," "above," "upper" and the like, may be used herein for ease of description to describe one element or feature's relationship to another element(s) or feature(s) as illustrated in the figures. Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected.

Hereinafter, the present invention will be explained in detail with reference to the accompanying drawings.

Figure 1:
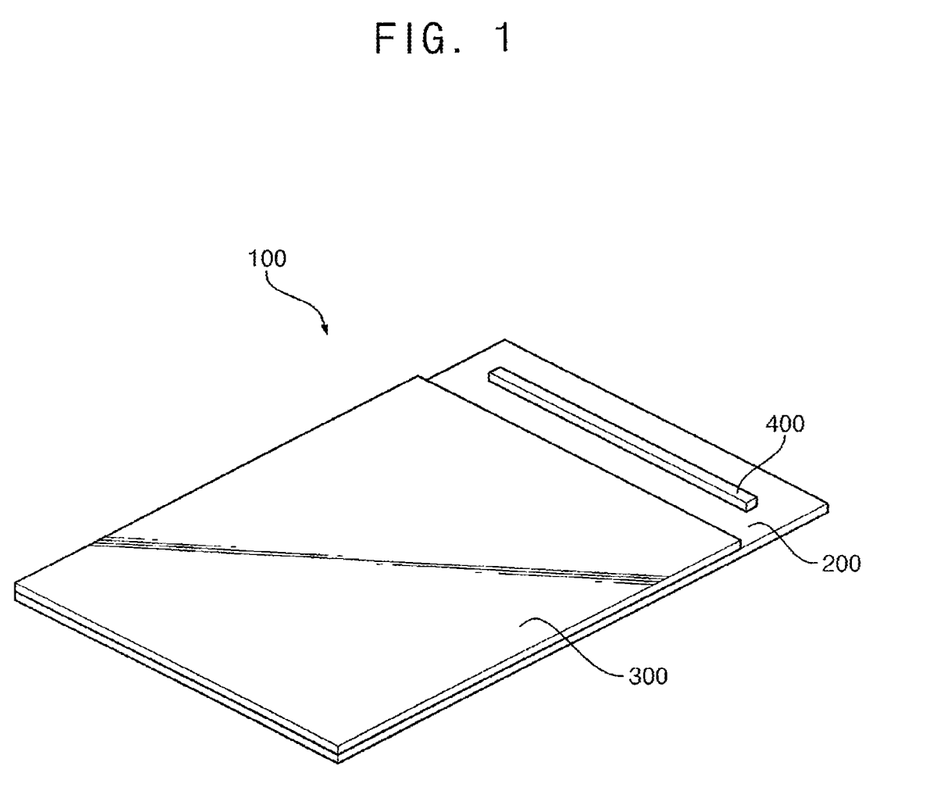
FIG. 1 is a perspective view illustrating a display apparatus according to an exemplary embodiment of the present invention.
Figure 2:
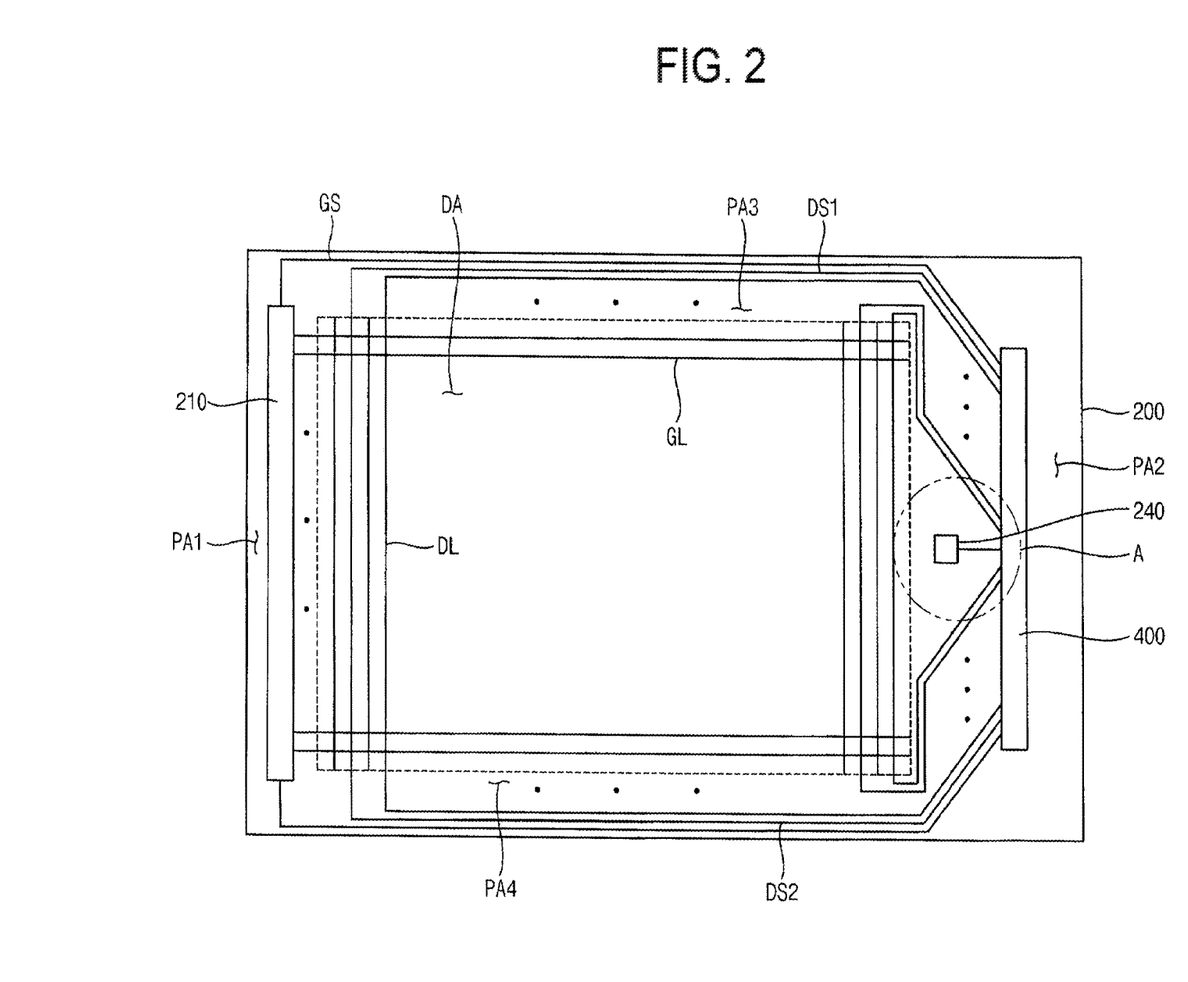
FIG. 2 is a plan view illustrating the display apparatus shown in FIG. 1.

FIG. 1 is a perspective view illustrating a display apparatus according to an exemplary embodiment of the present invention. FIG. 2 is a plan view illustrating the display apparatus shown in FIG. 1.

Referring to FIGS. 1 and 2, the display apparatus 100 in accordance with an exemplary embodiment of the present invention includes a display substrate 200, an opposite substrate 300 opposite to the display substrate 200, a liquid crystal disposed between the display substrate 200 and the opposite substrate 300, and a driver chip 400. The display apparatus 100, as shown in FIG. 2, includes a display area DA displaying an image, and first, second, third and fourth peripheral areas PA1, PA2, PA3, and PA4 surrounding the display area DA.

The display substrate 200 includes a plurality of gate lines GL extended in a first direction and a plurality of data lines DL extended in a second direction substantially perpendicular to the first direction. The gate and data lines GL and DL are formed in the display area DA. The data lines DL is formed on a gate insulating layer (not shown). The gate insulating layer insulates the data lines DL from the gate lines GL.

A thin film transistor (TFT, not shown) may be formed on an area in which the gate and data lines GL and DL cross each other. The TFT includes a gate electrode connected to the gate line GL, a source electrode connected to the data line DL, and a drain electrode connected to a pixel electrode. When a gate signal is applied to the gate electrode of the TFT through the gate line, the TFT is turned on and a data signal applied to the source electrode of the TFT through the data line DL is consequently applied to the pixel electrode.

The first peripheral area PA1 is adjacent to a first terminal of the gate line GL. The second peripheral area PA2 is adjacent to a second terminal of the gate line GL opposite to the first terminal of the gate line GL. The third peripheral area PA3 is adjacent to a first terminal of the data line DL. The fourth peripheral area PA4 is adjacent to a second terminal of the data line DL opposite to the first terminal of the data line DL. Therefore, the first, second, third and fourth peripheral areas PA1, PA2, PA3, and PA4 surround the display area DA.

The display substrate 200 may further include a gate driving circuit 210 formed in the first peripheral area PA1. The gate driving circuit 210 includes a shift register including a plurality of driving transistors. The gate driving circuit 210 may be simultaneously formed with the gate line GL, data line DL, and the thin film transistors by a thin film process. The gate driving circuit 210 sequentially outputs the gate signals to the gate lines in response to a gate control signal applied by the driver chip 400.

The driver chip 400 is disposed in the second peripheral area PA2 of the display substrate 200. Since the driver chip 400 is disposed at the second peripheral area PA2 corresponding to a right side of the display substrate 200, an area of the third peripheral area PA3 and an area of the fourth peripheral area PA4 may be reduced. The display apparatus 100 may include the driver chip disposed at the first peripheral area PA1 and a gate driving circuit 210 disposed at the second peripheral area PA2.

The driver chip 400 outputs various output signals for driving the display apparatus 100 in response to various control signals applied by an exterior device. For example, the driver chip 400 outputs a data signal applied to the data line DL, a gate control signal applied to the gate driving circuit 210, and a common voltage applied to the opposite substrate 300.

The display substrate 200 includes first data signal applying lines DS1 and second data signal applying lines DS2 to apply the data signals output from the driver chip 400 to the data lines DL.

Figure 3:
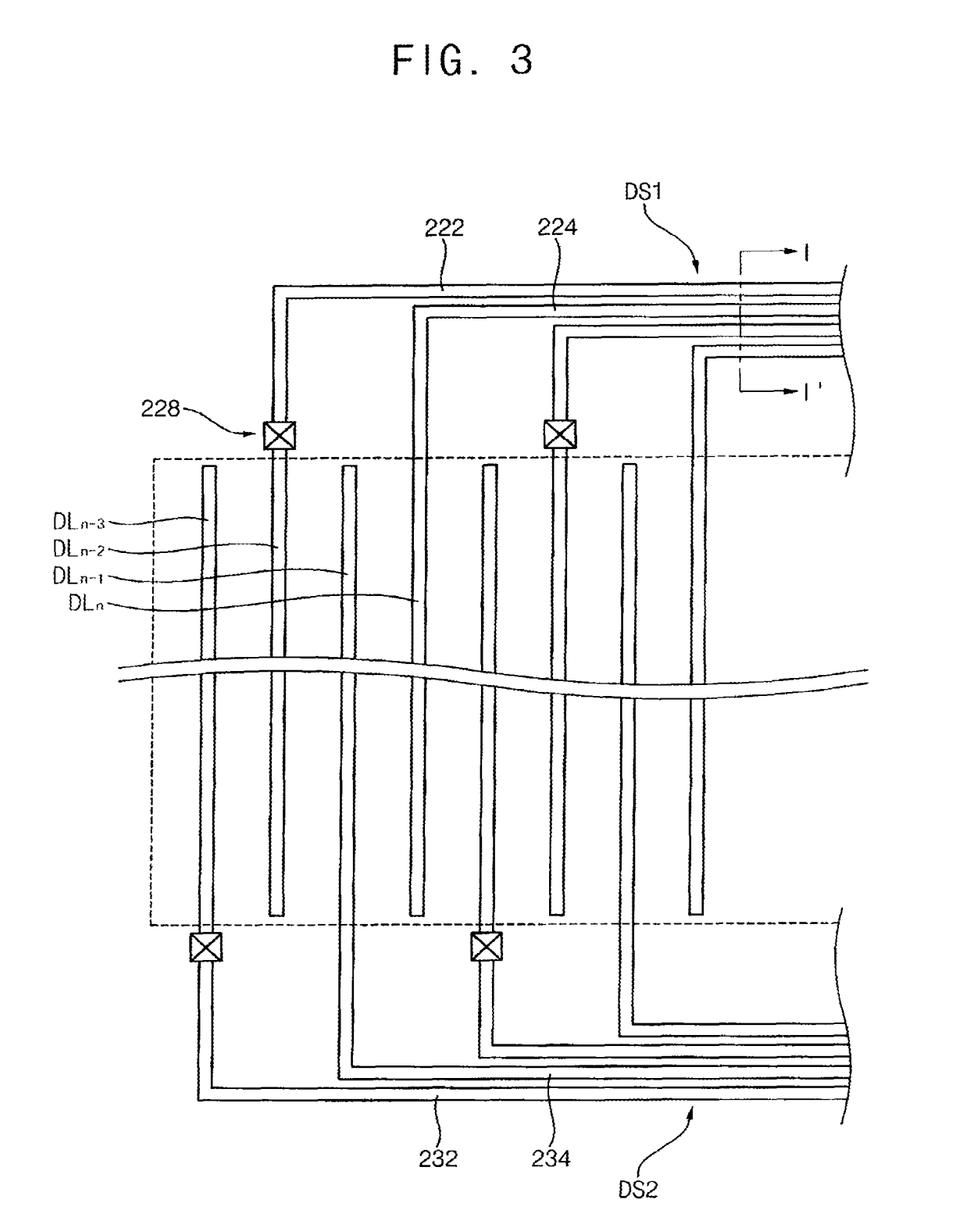
FIG. 3 is a plan view illustrating first and second data signal applying lines shown in FIG. 2.
Figure 4:
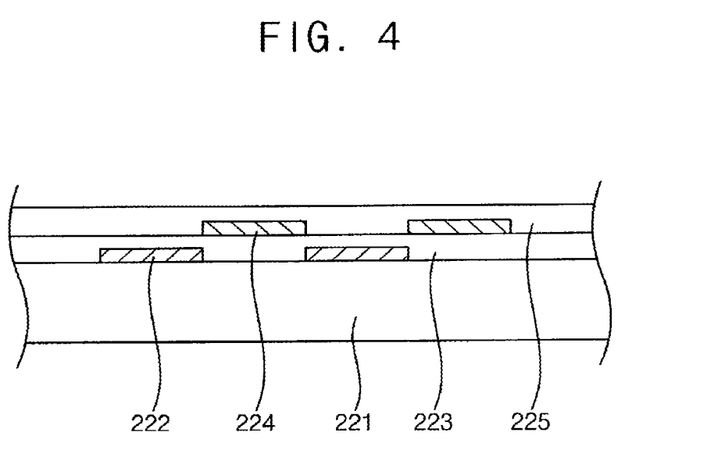
FIG. 4 is a cross-sectional view taken along a line I-I' shown in FIG. 3.

FIG. 3 is a plan view illustrating first and second data signal applying lines shown in FIG. 2. FIG. 4 is a cross-sectional view taken along a line I-I' shown in FIG. 3.

Referring to FIGS. 2 to 4, the first data signal applying lines DS1 are formed at the third peripheral area PA3 adjacent to the first terminal of the data line DL. The first data signal applying lines DS1 connect even-numbered data lines of the data lines DL with the driver chip 400.

The first data signal applying lines DS1 include first even-numbered signal applying lines 222 connected to (n-2)-th data lines DLn-2 of the even-numbered data lines DL and second even-numbered signal applying lines 224 connected to n-th data lines DLn of the even-numbered data lines DL, wherein "n" is a multiple number of four.

The first even-numbered signal applying lines 222 are formed on a base substrate of the display substrate 200, the gate insulating layer 223 is formed on the base substrate having the first even-numbered signal applying lines 222 formed thereon, and the second even-numbered signal applying lines 224 are formed on the gate insulating layer 223. Alternately, the second even-numbered signal applying lines 224 may be formed on the base substrate of the display substrate 200, the gate insulating layer 223 may be formed on the base substrate having the second even-numbered signal applying lines 224 formed thereon, and the first even-numbered signal applying lines 222 may be formed on the gate insulating layer 223. In an example embodiment, the first even-numbered signal applying lines 222 are formed on the base substrate of the display substrate 200 through a process of forming the gate lines GL, the gate insulating layer 223 is formed on the base substrate to cover the first even-numbered signal applying lines 222, and the second even-numbered signal applying lines 224 are formed on the gate insulating layer 223 through a process of forming the data lines DL. An overcoat layer and an organic insulating layer 225 may be formed on the second even-numbered signal applying lines 224 to cover the second even-numbered signal applying lines 224. In another example embodiment, the second even-numbered signal applying lines 224 may be formed on the base substrate of the display substrate 200 through the process of forming the gate lines GL, the gate insulating layer 223 may be formed on the base substrate having the second even-numbered signal applying lines 224 formed thereon, and the first even-numbered signal applying lines 222 may be formed on the gate insulating layer 223 through the process of forming the gate lines GL.

When the gate insulating layer 223 is disposed between the first even-numbered signal applying lines 222 and the second even-numbered signal applying lines 224, a distance between the first even-numbered signal applying lines 222 and the second even-numbered signal applying lines 224 may be reduced. Therefore, a width of the third peripheral area PA3 may be reduced.

When the first even-numbered signal applying lines 222 partially overlap the second even-numbered signal applying lines 224, the width of the third peripheral area PA3 may be still reduced. However, when an area in which the first even-numbered signal applying lines 222 overlap the second even-numbered signal applying lines 224 is too large, a signal distortion may be generated by a parasitic capacitance formed between the first even-numbered signal applying lines 222 and the second even-numbered signal applying lines 224. Therefore, the first even-numbered signal applying lines 222 may be spaced apart from the second even-numbered signal applying lines 224 such that the signal distortion is not generated.

Second data signal applying lines DS2 are formed at the fourth peripheral area PA4 adjacent to a second terminal of the data lines DL opposite to the first terminal of the data lines DL. The second data signal applying lines DS2 connect odd-numbered data lines DL of the data lines DL with the driver chip 400.

The second data signal applying lines DS2 include first odd-numbered signal applying lines 232 connected to (n-3)-th data lines DLn-3 of the odd-numbered data lines DL and second odd-numbered signal applying lines 234 connected to (n-1)-th data lines DLn-1.

The first odd-numbered signal applying lines 232 are formed on the base substrate of the display substrate 200, the gate insulating layer 223 is formed on the base substrate having the first odd-numbered signal applying lines 232 formed thereon, and the second odd-numbered signal applying lines 234 are formed on the gate insulating layer 223. Alternately, the second odd-numbered signal applying lines 234 may be formed on the base substrate of the display substrate 200, the gate insulating layer 223 may be formed on the base substrate having the second odd-numbered signal applying lines 234 formed thereon, and the first odd-numbered signal applying lines 232 may be formed on the gate insulating layer 233. In an example embodiment, the first odd-numbered signal applying lines 232 are formed on the base substrate of the display substrate 200 through a process of forming the gate lines GL, the gate insulating layer 223 is formed on the base substrate having the first odd-numbered signal applying lines 232 formed thereon, and the second odd-numbered signal applying lines 234 are formed on the gate insulating layer 223 through a process of forming the data lines DL. In another embodiment, the second odd-numbered signal applying lines 234 may be formed on the base substrate of the display substrate 200 through the process of forming the data lines DL, the gate insulating layer 233 is formed on the base substrate having the second odd-numbered signal applying lines 234, and the first odd-numbered signal applying lines 232 may be formed on the gate insulating layer 233 through the process of forming the gate lines GL.

When the gate insulating layer 233 is disposed between the first odd-numbered signal applying lines 232 and the second odd-numbered signal applying lines 234, a distance between the first and second odd-numbered signal applying lines 232 and 234 may be reduced. Therefore, a width of the fourth peripheral area PA4 may be reduced.

The first even-numbered signal applying lines 222 and the first odd-numbered signal applying lines 232 may be formed through a process of forming the gate lines GL and include a first metal that is a same material as the gate lines GL. The second even-numbered signal applying lines 224 and the second odd-numbered signal applying lines 234 may be formed through a process of forming the data lines DL and include a second metal that is a same material as the data lines DL.

When the first metal is different from the second metal, resistance of the first metal may be different from resistance of the second metal. Difference between the resistance of the first metal and the resistance of the second metal is compensated as follows. Width of each of the first even-numbered signal applying lines 222, the first odd-numbered signal applying lines 232, the second even-numbered signal applying lines 224, and the second odd-numbered signal applying lines 234 increases as specific resistance of each of the first even-numbered signal applying lines 222, the first odd-numbered signal applying lines 232, the second even-numbered signal applying lines 224, and the second odd-numbered signal applying lines 234 increases. For example, when the first metal includes aluminum neodymide/chromide (AlNd/Cr) having a specific resistance of about 4.5 and the second metal includes molybdenum (Mo) having a specific resistance of about 12, width of each of the first even-numbered signal applying lines 222 and the first odd-numbered signal applying lines 232 and width of each of the second even-numbered signal applying lines 224 and the second odd-numbered signal applying lines 234 may show a ratio of three to eight in proportion to a ratio of the specific resistance of the first metal and the specific resistance of the second metal.

Since the gate insulating layer 223 is disposed between a layer having the first even-numbered signal applying lines 222 and the first odd-numbered signal applying lines 232 formed therein and another layer having the data lines DL formed therein, a connecting part 228 connects the first even-numbered signal applying lines 222 to the (n-2)-th data lines DLn-2. The connecting part 228 also connects the first odd-numbered signal applying lines 232 to the (n-3)-th data lines DLn-3.

Figure 5:
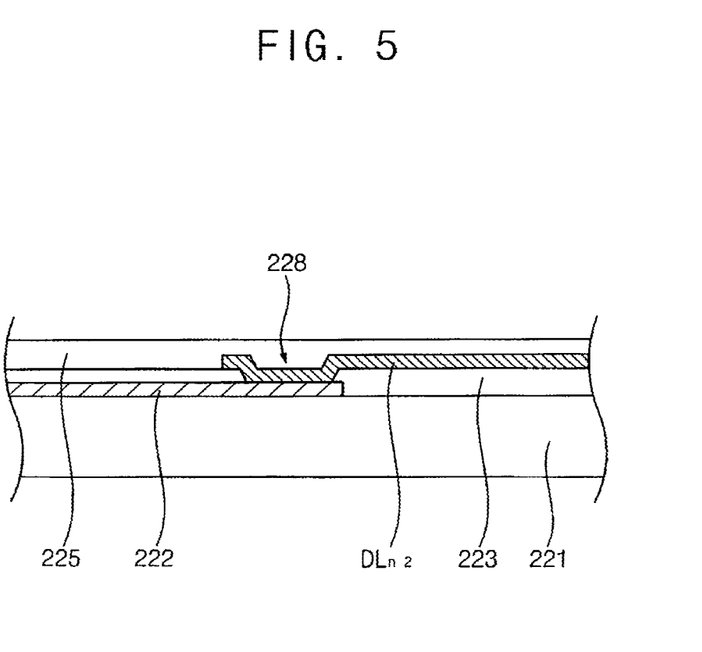
FIG. 5 is a cross-sectional view illustrating a connecting part connecting a first even-numbered signal applying line with an (n-2)-th data line according to an exemplary embodiment of the present invention.

FIG. 5 is a cross-sectional view illustrating a connecting part connecting a first even-numbered signal applying line with a (n-2)-th data line according to an exemplary embodiment of the present invention.

Referring to FIG. 5, the first even-numbered signal applying lines 222 are formed at a layer disposed under the gate insulating layer 223, and the (n-2)-th data lines DLn-2 are formed at another layer disposed on the gate insulating layer 223. The connecting part 228 is a portion that the first even-numbered signal applying lines 222 make direct contact with the (n-2)-th data lines DLn-2. That is, the (n-2)-th data lines DLn-2 is directly connected to the first even-numbered signal applying lines 222 through a contact hole formed in the gate insulating layer 223.

Figure 6:
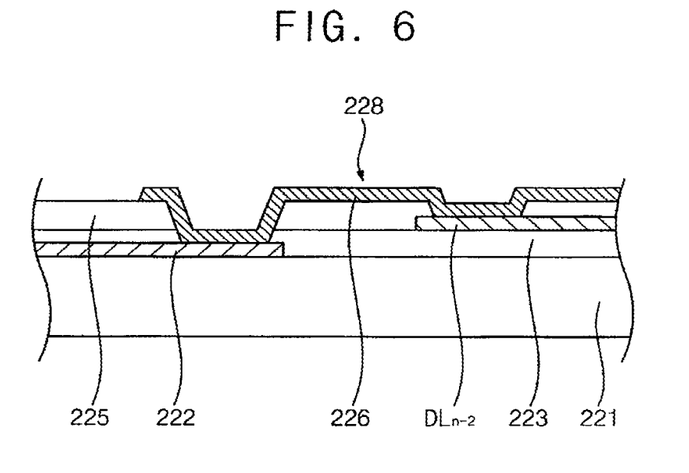
FIG. 6 is a cross-sectional view illustrating a connecting part connecting a first even-numbered signal applying line with an (n-2)-th data line according to another exemplary embodiment of the present invention.

FIG. 6 is a cross-sectional view illustrating a connecting part connecting a first even-numbered signal applying line with an (n-2)-th data line according to another exemplary embodiment of the present invention.

Referring to FIG. 6, the connecting part 228 includes a bridge electrode 226 connecting the first even-numbered signal applying lines 222 with the (n-2)-th data lines DLn-2. That is, the bridge electrode 226 includes a first terminal connected to the first even-numbered signal applying lines 222 through a contact hole formed at an organic layer 225 and the gate insulating layer 223, and a second terminal connected to the (n-2)-th data lines DLn-2 through a contact hole formed at the organic layer 225. For example, the bridge electrode 226 includes indium tin oxide (ITO).

A structure illustrating connection of the first odd-numbered signal applying lines 232 and the (n-3)-th data lines DLn-3 is substantially a same as a structure illustrating connection of the first even-numbered signal applying lines 222 and the (n-2)-th data lines DLn-2, which has been described above. Thus, any further explanation concerning the structure will be omitted.

The display apparatus 100, as shown in FIGS. 2 and 3, includes first data signal applying lines DS1 formed at the third peripheral area PA3 and second data signal applying lines DS2 formed at the fourth peripheral area PA4. However, the display apparatus 100 may include first data lines DS1 formed at the fourth peripheral area PA4 and second data lines DS2 formed at the third peripheral area PA3.

Referring to FIG. 2, the display substrate 200 includes the gate driving circuit 210 formed at the first peripheral area PA1 and gate signal applying lines GS connecting the driver chip 400 disposed at the second peripheral area PA2 with the gate driving circuit 210.

The gate signal applying lines GS connect the driver chip 400 with the gate driving circuit 210 in at least one of the third and fourth peripheral areas PA3 and PA4. The gate signal applying lines GS disposed in the third peripheral area PA3 is formed at an outer area of the first data signal applying lines DS1, such that the gate signal applying lines GS do not cross the second data signal applying lines DS2. The gate signal applying lines GS may be the closest to one of the first data signal applying lines DS1 and the second data signal applying lines DS2, so that the width of the third peripheral area PA3 or the fourth peripheral area PA4 is reduced.

The gate control signal is applied to the gate driving circuit 210 through the gate signal applying lines GS. For example, the gate signal applying lines GS may include a start signal line receiving a start signal to start operations of the shift registers of the gate driving circuit 210, first and second clock signal lines transferring a first clock signal and a second clock signal having a phase reversed to that of the first clock signal, and a gate-off signal line transferring a gate-off signal to turn off the thin film transistor connected to the gate line GL.

Figure 7:
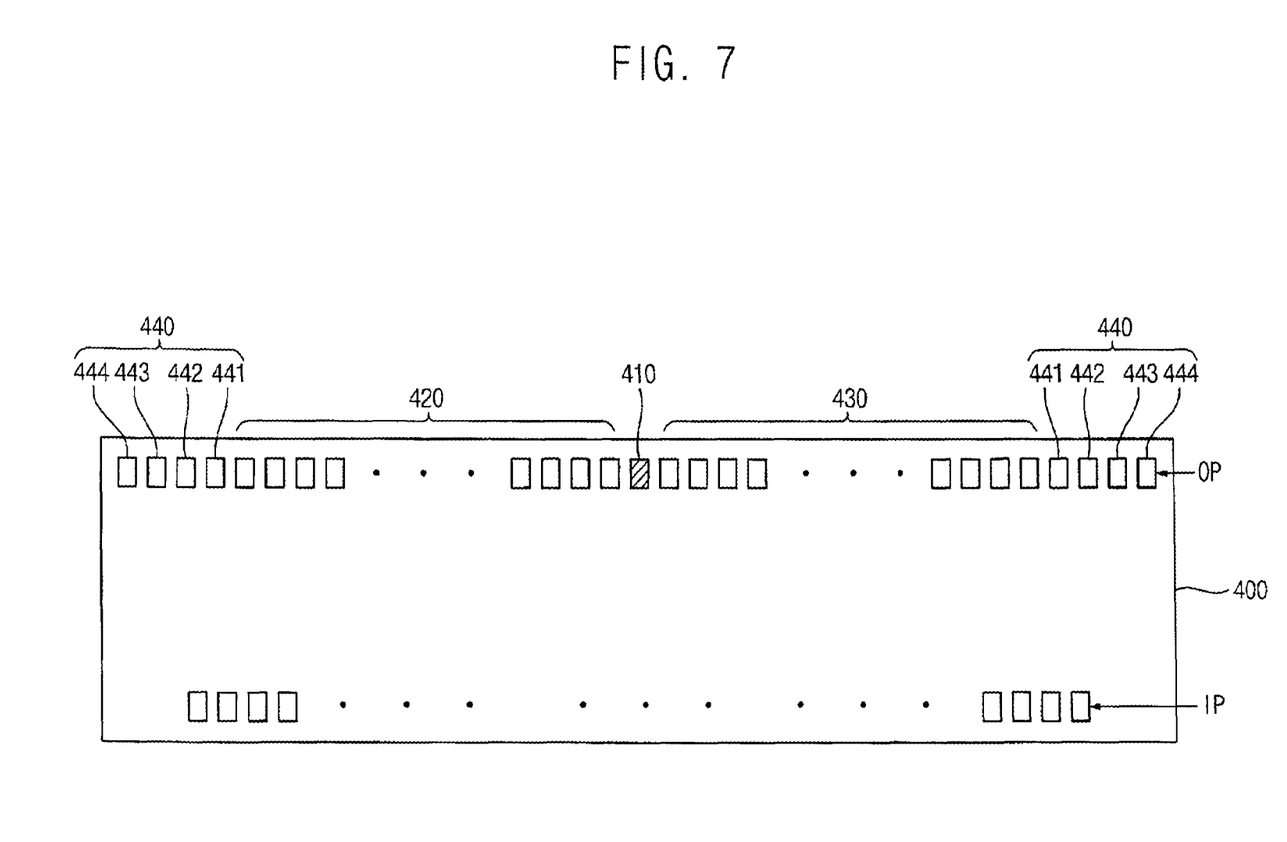
FIG. 7 is a plan view illustrating a pad structure of a driver chip shown in FIG. 2.

FIG. 7 is a plan view illustrating a pad structure of a driver chip shown in FIG. 2.

Referring to FIGS. 2 and 7, the driver chip 400 includes input pads IP and output pads OP, which are formed on a surface connected to the display substrate 200. The driver chip 400 outputs various output signals through the output pads OP to drive the display apparatus 100 in response to various control signals. The various control signals are inputted by an exterior device through the input pads IP. For example, the driver chip 400 outputs the data signal applied to the data lines DL, the gate control signal applied to the gate driving circuit 210, and the common voltage applied to the opposite substrate 300.

The output pads OP are arranged in a line along a direction in which the gate lines GL are arranged. Alternately, the output pads OP may be arranged in multiple lines.

The output pads OP include a common voltage pad 410, first data signal pads 420, second data signal pads 430, and gate signal pads 440.

The common voltage pad 410 is disposed at a center of the output pads OP. The common voltage pad 410 outputs a common voltage Vcom applied to the common electrode formed at the opposite substrate 300.

The first data signal pads 420 are disposed at a first side with respect to the common voltage pad 410. For example, the first data signal pads 420 are disposed at the first side close to the third peripheral area PA3 with respect to the common voltage pad 410. The first data signal pads 420 are connected to the first data signal applying lines DS1. Data signals output from the first data signal pad 420 are applied to even-numbered data lines DL through the first data signal applying lines DS1.

The second data signal pads 430 are disposed at a second side opposite to the first side with respect to the common voltage pad 410. For example, the second data signal pads 430 are disposed at the second side close to the fourth peripheral area PA4 with respect to the common voltage pad 410. The second data signal pads 430 are connected to the second data signal applying lines DS2. Data signals output from the second data signal pads 430 are applied to odd-numbered data lines DL through the second data signal applying lines DS2.

The gate signal pads 440 are respectively disposed in an outer area of the first and second data signal pads 420 and 430. The gate signal pads 440 are connected to the gate signal applying lines GS. Gate control signals output from the gate signal pads 440 are applied to the gate driving circuit through the gate signal applying lines GS.

The gate signal pads 440 may include a first pad 441 outputting a start signal, second and third pads 442 and 443 respectively outputting first and second clock signals, and a fourth pad 444 outputting the gate-off signal. The fourth pad 444 may be disposed in an outermost area of the driver chip 400, and the first pad 441 may be disposed in an inner area of the driver chip 400 to prevent the gate signal pads 440 from being corroded.

The display substrate 200 may include a short point 240 in which the display substrate 200 is electrically connected to the opposite substrate 300.

Figure 8:
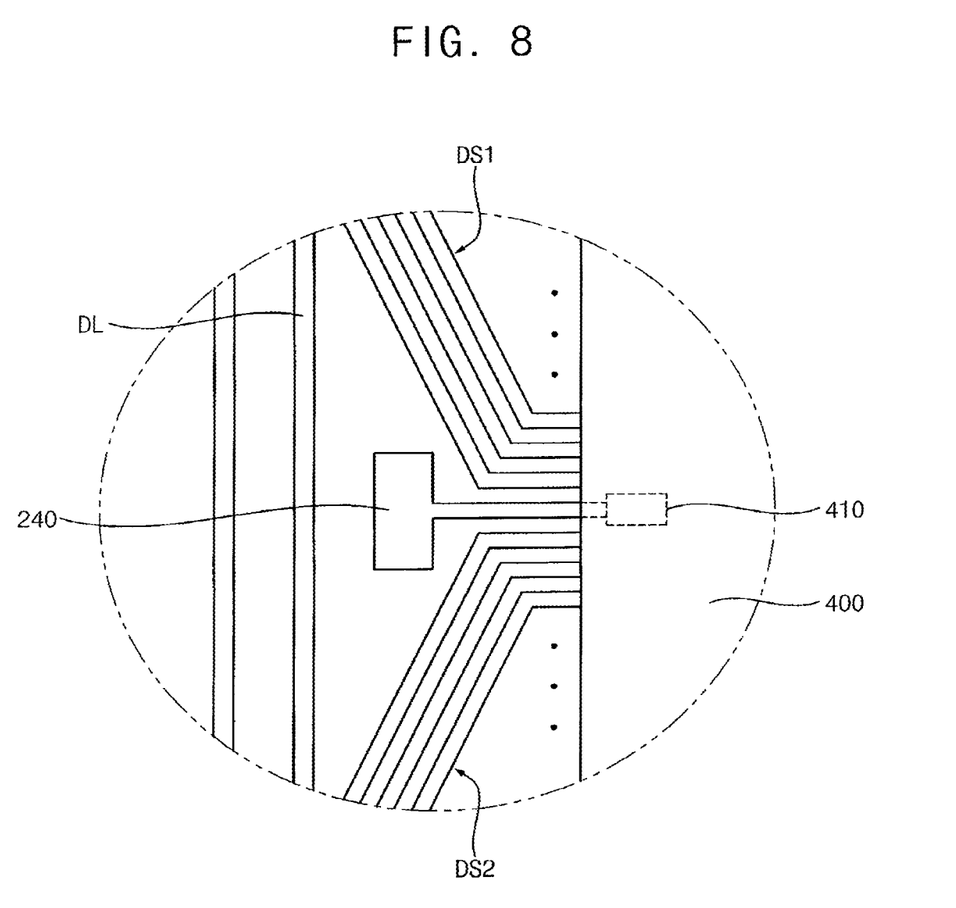
FIG. 8 is an enlarged view showing a portion "A" shown in FIG. 2.

FIG. 8 is an enlarged view showing a portion "A" shown in FIG. 2.

Referring to FIGS. 2 and 8, the short point 240 is disposed at the second peripheral area PA2 and formed between the first data signal applying lines DS1 and the second data signal applying lines DS2. The short point 240 is connected to the common voltage pad 410 of the driver chip 400.

For example, the first data signal applying lines DS1 are curved toward the third peripheral area PA3, and the second data signal applying lines DS2 are curved toward the fourth peripheral area PA4. The short point 240 is formed at a region in which the first and second data signal lines DS1 and DS2 are divided. When the short point 240 is formed at the region in which the first and second data signal lines DS1 and DS2 are divided, length of a path for connecting the short point 240 with the common voltage pad 410 may be reduced and space utilization may be improved.

The common voltage output from the common voltage pad 410 is applied to the opposite substrate 300 through the short point 240.

The first and second data signal applying lines DS1 and DS2 connected to the data lines DL adjacent to the driver chip 400 are curved in a region formed between the first and second data signal applying lines DS1 and DS2, so that length of each of the first and second data signal applying lines DS1 and DS2 are similar to each other. Therefore, resistance of each of the first and second data signal applying lines DS1 and DS2 may be similar to each other.

Figure 9:
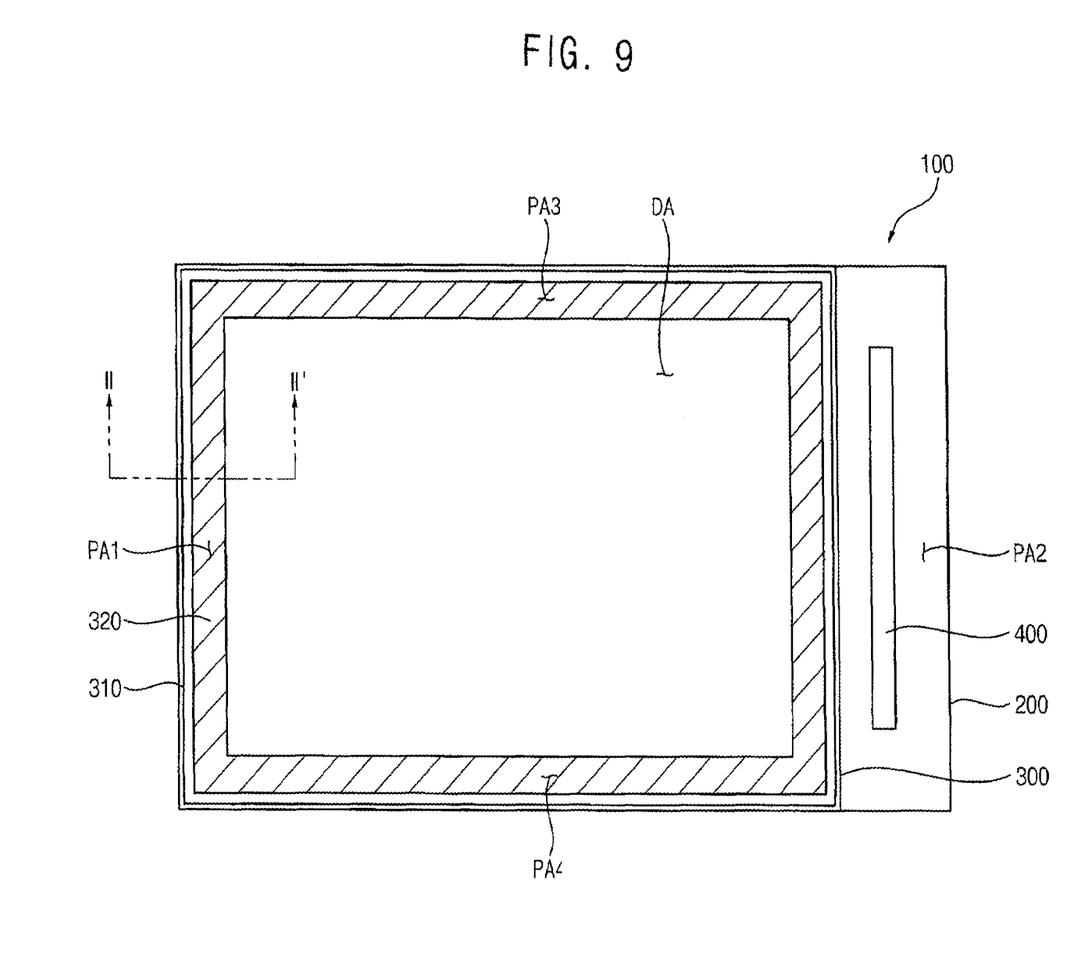
FIG. 9 is a plan view illustrating the display apparatus shown in FIG. 1.
Figure 10:
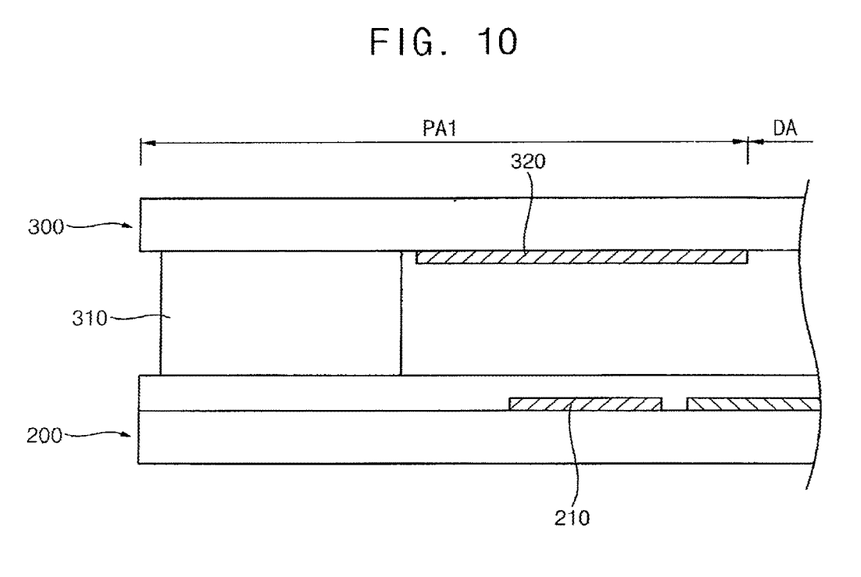
FIG. 10 is a cross-sectional view of a display apparatus taken along a line II-II' shown in FIG. 9.

FIG. 9 is a plan view illustrating the display apparatus shown in FIG. 1. FIG. 10 is a cross-sectional view of a display apparatus taken along a line II-II' shown in FIG. 9.

Referring to FIGS. 2, 9, and 10, the display apparatus 100 includes a seal line 310 combining the display substrate 200 with the opposite substrate 300. The seal part 310 is disposed between the display substrate 200 and the opposite substrate 300. The seal part 310 is disposed on edges of the display substrate 200. The seal part 310 prevents a liquid crystal disposed between the display substrate and the opposite substrate from leaking.

The seal part 310 includes a light curable resin that is cured by external light, such as ultra-violet light. Since a plurality of first and second data signal applying lines DS1 and DS2 and a plurality of gate signal applying lines GS are formed at the display substrate 200 corresponding to the first, second, third and fourth peripheral areas PA1, PA2, PA3, and PA4, the seal part 310 may not be entirely exposed to the external light when the external light is irradiated onto the display substrate 200. Therefore, the external light may be irradiated onto the opposite substrate 300 to harden the seal part 310.

The opposite substrate 300 includes a light shielding layer 320 formed in the first, second, third and fourth peripheral areas PA1, PA2, PA3, and PA4. The light shielding layer 320 prevents light from passing through the first, second, third and fourth peripheral area PA1, PA2, PA3, and PA4.

Since the gate driving circuit 210 including a plurality of driving transistors is formed in the fist peripheral area PA1, the transistors may have some trouble generated by external light when a front exposing method is employed. Therefore, the gate driving circuit 210 is formed under the light shielding layer 320 and covered by the light shielding layer 320, so that the gate driving circuit 210 is prevented from being exposed to the external light.

The light shielding layer 320 corresponding to the seal part 310 may be removed in order to expose the seal part 310 to front light. When the light shielding layer 320 covers the seal part 310, the seal part 310 may not be exposed to the external light irradiated toward the opposite substrate 300. Therefore, the light shielding layer 320 may be partially removed to be exposed to the external light.

Figure 11:
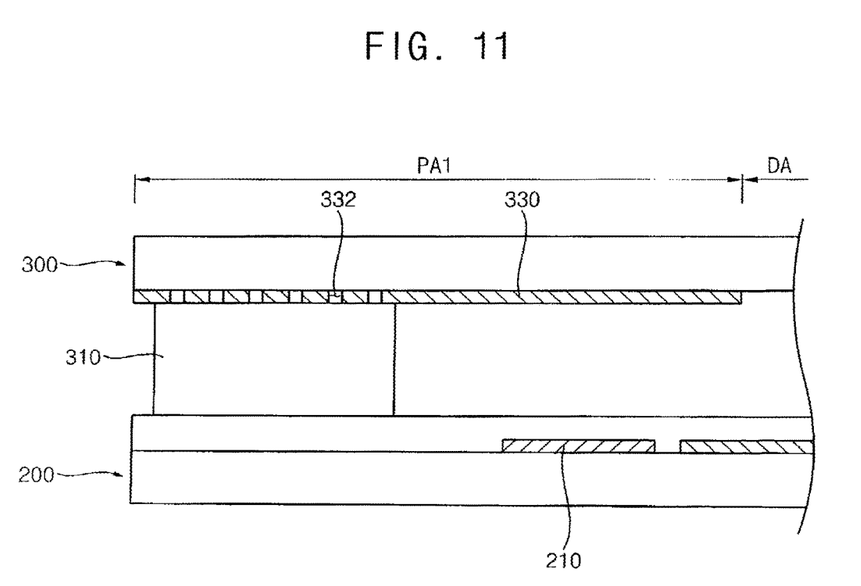
FIG. 11 is a cross-sectional view illustrating a light shielding film according to another exemplary embodiment of the present invention.

FIG. 11 is a cross-sectional view illustrating a light shielding film according to another exemplary embodiment of the present invention.

Referring to FIG. 11, the light shielding layer 330 may include a slit part 332 formed at an area corresponding to the seal part 310 in order to expose the seal part 310 to the external light. The seal part 310 is cured by external light irradiated through the slit part 332 onto the opposite substrate 300.

According to the display apparatus, the driver chip is disposed at a left portion of the display area or a right portion of the display area, so that a width of an upper portion of the display area or a lower portion of the display area may be decreased.

In addition, the data signal applying lines connected to the data line is divided into the even-numbered data signal applying lines and the odd-numbered data signal applying lines. The even-numbered data signal applying lines and the odd-numbered data signal applying lines are separately disposed at the upper portion of the display area and the lower portion of the display area. The even-numbered data signal applying lines are arranged at a first layer in a zigzag shape and the odd-numbered data signal applying lines are arranged at a second layer different from the first layer in the zigzag shape. Therefore, width of the upper and lower portions of the display area may be decreased.

Having described the exemplary embodiments of the present invention and its advantage, it is noted that various changes, substitutions and alterations can be made herein without departing from the spirit and scope of the invention as defined by appended claims.

What is claimed is:

1. A display apparatus including a display area, including a first peripheral area which is adjacent to the display area, and including a second peripheral area which is adjacent to the display area and opposite the first peripheral area, the display apparatus comprising:
- a gate line disposed in the display area;
- a data line disposed in the display area and insulated from the gate line;
- a thin film transistor disposed in the display area and connected to the gate line and the data line;
- an output pad outputting a data signal and disposed in the first peripheral area; and
- a gate driving circuit disposed in the second peripheral area and comprising a shift register including a driving transistor,
- wherein two opposite sides of the display area are disposed between the output pad and the gate driving circuit in a plan view of the display apparatus, wherein the driving transistor is disposed on a same layer as the thin film transistor, and wherein the first peripheral area is spaced apart from the second peripheral area.

2. The display apparatus of claim 1, further comprising: a light shielding layer over the driving transistor.

3. The display apparatus of claim 1, wherein the gate line extends in a first direction, wherein the data line extends in a second direction substantially perpendicular to the first direction, wherein the first peripheral area is adjacent to a first end of the gate line, and wherein the second peripheral area is adjacent to a second end of the gate line.

4. The display apparatus of claim 1, further comprising a driver chip including the output pad.

5. The display apparatus of claim 4, wherein the driver chip outputs a gate control signal to the gate driving circuit.

* * * * *